(12) United States Patent
Yi et al.

(10) Patent No.: US 10,404,819 B2
(45) Date of Patent: Sep. 3, 2019

(54) LOCAL SERVER SYSTEM AND METHOD OF RELAYING DATA IN THE SAME FOR SWITCHING BETWEEN THIN CLIENT ENVIRONMENT AND THICK CLIENT ENVIRONMENT

(71) Applicant: CORELINE SOFT CO., LTD., Seoul (KR)

(72) Inventors: Jaeyoun Yi, Seoul (KR); Byeong Soo Kim, Gyeonggi-do (KR)

(73) Assignee: CORELINE SOFT CO., LTD., Seoul (KR)

( * ) Notice: Subject to any disclaimer, the term of this patent is extended or adjusted under 35 U.S.C. 154(b) by 88 days.

(21) Appl. No.: 15/168,857

(22) Filed: May 31, 2016

(65) Prior Publication Data
US 2016/0352868 A1 Dec. 1, 2016

(30) Foreign Application Priority Data
May 29, 2015 (KR) .................. 10-2015-0076492

(51) Int. Cl.
*H04L 29/08* (2006.01)
(52) U.S. Cl.
CPC ...... *H04L 67/2842* (2013.01); *H04L 67/2861* (2013.01)
(58) Field of Classification Search
CPC ................... H04L 67/2842; H04L 67/2861
See application file for complete search history.

(56) References Cited

U.S. PATENT DOCUMENTS

| | | | |
|---|---|---|---|
| 7,075,544 B2 | 7/2006 | Kim et al. | |
| 7,089,553 B1* | 8/2006 | Glaser | G06F 8/61 709/223 |
| 8,972,990 B2 | 3/2015 | Ashok et al. | |
| 9,118,947 B2 | 8/2015 | Kim et al. | |
| 2002/0156650 A1* | 10/2002 | Klein | G06F 19/3418 705/2 |
| 2008/0249401 A1* | 10/2008 | Watanabe | A61B 8/13 600/437 |
| 2009/0002569 A1 | 1/2009 | Matsukura et al. | |
| 2009/0043815 A1* | 2/2009 | Lee | G06F 16/9566 |

(Continued)

FOREIGN PATENT DOCUMENTS

| | | |
|---|---|---|
| KR | 10-0422679 B1 | 3/2004 |
| KR | 10-0490401 B1 | 5/2005 |

(Continued)

*Primary Examiner* — Mohamed A. Wasel
(74) *Attorney, Agent, or Firm* — Mintz Levin Cohn Ferris Glovsky and Popeo, P.C.; Kongsik Kim

(57) ABSTRACT

A local server system and a method of relaying data in the local server system are disclosed. The local server system includes a database configured to store image data downloaded from a remote server, and a processor configured to request the image data from the remote server and download the image data. The processor requests first image data corresponding to first result data from the remote server. The processor downloads the first image data from the remote server. The processor generates second result data based on the downloaded first image data. The processor provides the second result data to the local client when the local client requests the second result data corresponding to the first image data from the remote server.

18 Claims, 5 Drawing Sheets

(56) References Cited

U.S. PATENT DOCUMENTS

| | | | |
|---|---|---|---|
| 2010/0281138 A1* | 11/2010 | Froimtchuk | G06F 9/5044 |
| | | | 709/219 |
| 2013/0318521 A1 | 11/2013 | Monaghan et al. | |
| 2014/0115639 A1 | 4/2014 | Kim et al. | |
| 2014/0219179 A1 | 8/2014 | Zakrzewski | |
| 2014/0226602 A1 | 8/2014 | Zakrzewski | |
| 2014/0280683 A1* | 9/2014 | Yanagihara | H04L 67/2842 |
| | | | 709/213 |
| 2014/0310386 A1* | 10/2014 | Srinivasan | H04L 65/605 |
| | | | 709/219 |
| 2014/0344945 A1* | 11/2014 | Buer | G06F 21/73 |
| | | | 726/26 |
| 2015/0172416 A1* | 6/2015 | Morancy | H04L 67/1097 |
| | | | 709/219 |

FOREIGN PATENT DOCUMENTS

| | | |
|---|---|---|
| KR | 10-2005-0093420 | 9/2005 |
| KR | 10-0763757 | 9/2007 |
| KR | 10-2008-0114509 A | 12/2008 |
| KR | 10-2014-0050522 A | 4/2014 |
| KR | 10-2014-0068059 | 6/2014 |
| KR | 10-2014-0068060 | 6/2014 |
| WO | 01/018664 A1 | 3/2001 |

* cited by examiner

LOCAL SERVER SYSTEM AND METHOD OF RELAYING DATA IN THE SAME FOR SWITCHING BETWEEN THIN CLIENT ENVIRONMENT AND THICK CLIENT ENVIRONMENT

CROSS-REFERENCE TO RELATED APPLICATION

This application claims under 35 U.S.C. § 119(a) the benefit of Korean Application No. 10-2015-0076492 filed on May 29, 2015, which is incorporated herein by reference.

TECHNICAL FIELD

The present invention relates generally to a local server system and a method of relaying data in the local server system, which are capable of efficiently switching between a thin client environment and a thick client environment.

BACKGROUND ART

As a computing environment oriented toward desktop personal computers (PCs) transitions to a computing environment oriented toward mobile devices such as laptops, smart phones, etc., there is a tendency for a thin client computing environment to be provided to a plurality of users.

A thin client literally refers to a light-weighted simple terminal. It is expected that thin clients will replace large heavy-weighted desktop PCs that have occupied large spaces so far. Thin clients are not limited to specific shapes, but may be provided in various forms.

Thin client computing does not only change the appearances of PCs, but also fundamentally changes the method of computing. Thin client computing may be also called "server-based computing." The term "server-based" means that all appliances are disposed on a server, as in the case where money is deposited in a bank. Accordingly, thin client computing does not require that the capacity of the memory or storage of a client should be high. It is sufficient if a client connects to a server whenever it requires a program, in which case it is sufficient if software is executed on the server, rather than being downloaded and used, and then the results of the execution are received and displayed on a screen. In particular, in the case of mobile terminals that are sensitive to power consumption due to the limited capacity of batteries, the use of effective computing is enabled using a small quantity of resources by minimizing a computation function.

Meanwhile, Korean Patent No. 10-0490401 entitled "Image Processing Apparatus and Method in Thin-Client (TC) Environment" discloses an image processing apparatus, including a communication network, a client system, and a server configured to execute a predetermined application in response to a request from the client system and to transmit results to the client system over the communication network, wherein the server includes an image processing means configured to process the rendering of a graphic signal to be processed through acceleration in response to a request from the client system and to encode the graphic signal processed through acceleration and a video signal associated with the graphic signal.

Although the preceding technology has the advantage of minimizing the load of the TC server through the processing of a graphic part, processed in the TC server in a software manner, in a hardware manner, server-based computing may not be smoothly performed because the burden of the server or the data transmission burden of the network is high in the case where the number of local clients that a single remote server takes charge of is large or the size of data that the server and the client needs to transmit in a TC environment is large.

SUMMARY OF THE DISCLOSURE

An object of the present invention is to provide a local server system and a method of relaying data in the local server system, particularly a local server system and a method of relaying data in the local server system, which are capable of switching from a thin client environment to a thick client environment.

Conventionally, when a single remote server takes charge of too large number of local clients, or when the very large amount of data that needs to be transmitted by a server and a client in a thin client environment, the cases occur frequently in which the burden of the server or the data transmission burden of a network is great and thus server-based computing is not effectively operated. An object of the present invention is to reduce the computational burden of the server in a local computer apparatus and reduce the burden of an overall network by reducing the amount of data transmission via a remote network.

In particular, with regard to medical image data, in the case of computed tomography (CT) or magnetic resonance imaging (MRI), an original image needs to be stored on a server and result data obtained by performing image processing on the original image needs to be also stored on the server. In the case where the server performs new image processing and makes updates by frequently transmitting result data whenever the user of a local client changes the viewpoint of an image or changes a displaying option for an image, excessive network resources between the server and the local client are occupied, which may cause for a reduction in the performance of the overall network.

Accordingly, an object of the present invention is to provide a hybrid server-based computing technique that enables a local server to seamlessly replace a part or all of the functions of a remote server based on local computing resources (including computing power, memory capacity, storage capacity, etc.) that can be utilized by a local client.

Furthermore, an object of the present invention is to share task environment information, applied during image processing in a remote server in order to display an image, with a local server, thereby providing equivalent result data to a local client to the extent that the user of the local client is unable to distinguish between result data obtained by the local server and result data obtained by the remote server.

In accordance with an aspect of the present invention, there is provided a local server system, including: a database configured to store image data downloaded from a remote server; and a processor configured to request the image data from the remote server, and to download the image data; wherein the processor includes: a data request unit configured to request first image data corresponding to first result data, requested from a remote server by a local client, from the remote server; a data reception unit configured to download the first image data from the remote server; an image processing unit configured to generate second result data based on the downloaded first image data; and a data transmission unit configured to provide the second result data to the local client when the local client requests the second result data corresponding to the first image data from the remote server.

The data reception unit may download the image data as a background process while the local client is receiving the first result data from the remote server. The data reception unit may be further configured to download the task environment information of the remote server together with the first image data. The image processing unit may be further configured to generate the second result data based on the first image data when the local client requests the second result data corresponding to the first image data from the remote server. The image processing unit may be further configured to generate the second result data based on the first image data, the first result data, and an image processing workflow.

The local server system may further include an event control unit configured to control the local client so that a user menu regarding an event intended to switch a main role of the first image data processing function of the remote server to the local server is provided to the user of the local client when the downloading of the first image data has been completed. The data transmission unit may be configured to upload the second result data to the remote server.

In accordance with another aspect of the present invention, there is provided a method of relaying data in a local server, the method including: requesting, by a local server, image data corresponding to first result data, requested from a remote server by a local client, from the remote server; downloading, by the local server, the image data from the remote server; generating, by the local server, second result data based on the downloaded image data; and providing, by the local server, the second result data to the local client when the local client requests the second result data corresponding to the image data from the remote server.

The downloading may be performed as a background process while the local client is receiving the first result data from the remote server. The downloading may include downloading the image data and the first result data together from the remote server. The downloading may include downloading the task environment information of the remote server together with the image data.

The generating may include generating the second result data by applying the downloaded task environment information of the remote server thereto. The downloading may include downloading at least one of information about the configuration of a layout, information about the rendering settings of each screen within the layout, and information about settings regarding a displaying status as the task environment information.

The generating may include generating the second result data based on the image data when the local client requests the second result data corresponding to the image data from the remote server. The generating may include generating the second result data based on the image data, the first result data, and an image processing workflow.

The method may further include controlling, by the local server, the local client so that a user menu regarding an event intended to switch a main role of the image data processing function of the remote server to the local server is provided to the user of the local client when the downloading of the image data has been completed. The method may further include uploading, by the local server, the second result data to the remote server.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Embodiments of the present invention will be described in detail below with reference to the accompanying drawings. In the following description, detailed descriptions of related known components or functions that may unnecessarily make the gist of the present invention obscure will be omitted. Furthermore, in the following description of embodiments of the present invention, specific numerical values are merely examples.

The present invention relates generally to a local server system and a method of relaying data in the local server system, which are capable of seamlessly switching from a thin client environment to a thick client environment.

Figure 1:
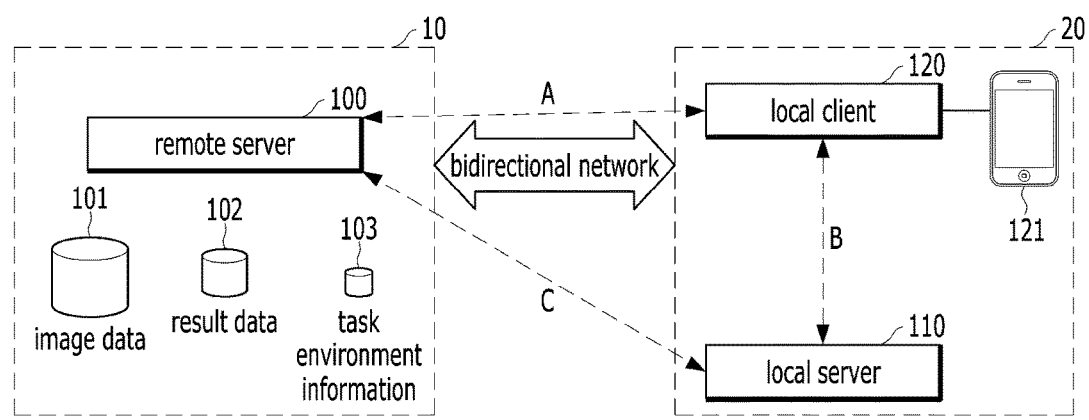
FIG. 1 is a diagram schematically showing the overall configuration of hybrid server-based computing according to according to an embodiment of the present invention.

FIG. 1 is a diagram schematically showing the overall configuration of hybrid server-based computing according to according to an embodiment of the present invention.

Referring to FIG. 1, the overall configuration of hybrid server-based computing according to the embodiment of the present invention is described in brief. The hybrid server-based computing according to the embodiment of the present invention may basically include a remote server 100, a local server 110, and a local client 120. The remote server 100 refers to a server belonging to a remote computing environment 10, and the local server 110 and the local client 120 refer to the server and client of a local computer 20, respectively.

In this case, the remote server 100 may refer to a central server, a cloud, or a data center, and may store image data 101, result data 102, and task environment information 103.

The local client 120 may receive the result data 102 obtained by processing the image data 101 in the remote server 100 (see "A"), or may receive result data (not shown) obtained through processing in the local server 110 (see "B"). In this case, in order for the local client 120 to receive the result data obtained through processing in the local server 110 (see "B"), the local server 110 may request the image data 101 corresponding to the result data 102, requested from the remote server 100 by the local client 120, from the remote server 100, may download the image data 101 (see "C"), may generate the result data to be provided to the local client 120 based on the image data 101, and then may provide the result data.

Furthermore, the local client 120 may display the received result data on the terminal screen 121 of the local client 120, and bidirectional network communication is performed between the remote server 100 and the local server 110 or between the remote server 100 and the local client 120.

The local server 110 refers to a computing unit including a logical operation function and an arithmetic operation function in the local computer 20. The local server 110 may be interpreted as an icon that symbolically represents the computing power of the local client 120 within the same local computer 20. The load of a task that the local server 110 will partially take charge of or will take over may be determined based on computing resources (including the performance of a processor adapted to execute logical operations and arithmetic operations, the amount of memory adapted to store temporary data during the execution of operations, and the amount of storage adapted to store result and image data) that are possessed by the local server 110.

If the process of processing the image data can be supported by the computing resources possessed by the local server 110, the local client 120 may check whether the image data 101 or result data 102 corresponding to the result data 102 to be received from the remote server 100 has been stored on the local server 110 of the local computer 20.

If the result data to be displayed by the local client 120 or the image data corresponding to the result data has been stored on the local server 110, the local server 110 may generate the result data by processing the image data for the sake of the local client 120. In this case, a data link between the local client 120 and the local server 110 is denoted by "B."

When the image data or the result data has not been stored on the local server 110, the local client 120 may request the result data 102 from the remote server 100 via the data link A. While the local client 120 is receiving the result data 102 from the remote server 100 via the data link A, the local server 110 may start to download the image data 101 corresponding to the result data 102 from the remote server 100 via the data link C. The local server 110 may download the result data 102 together with the image data 101. The process in which the local server 110 downloads the image data 101 or the result data 102 from the remote server 100 via the data link C may be performed as a background process without influencing the process of data transmission and reception between the local client 120 and the remote server 100 via the data link A and the process of data transmission and reception between the local client 120 and the terminal screen 121. That is, this means that the priority of the process of the data transmission and reception between the local client 120 and the remote server 100 via the data link A and the priority of the process of the data transmission and reception between the local client 120 and the terminal screen 121 are higher than the priority of the process in which the local server 110 downloads the image data 101 or the result data 102 from the remote server 100 via the data link C.

When the downloading of the image data 101 or result data 102 via the data link C by the local server 110 has been completed, the local server 110 previously loads the downloaded image data or result data into memory inside the local server 110.

When the downloading of the image data 101 or result data 102 via the data link C by the local server 110 has been completed, the local server 110 may notify the local client 120 of the completion of the downloading. Furthermore, in this case, the local server 110 may temporarily stop a task, such as image processing, the downloading of an image or the like, and may request the local client 120 to provide notification of a switch in the agent of the provision of data and the performance of operations from the remote server 100 to the local server 110 to the user of the local client 120 or to inquire whether to switch the agent of the user. The local client 120 may display a user menu, adapted to provide notification of a switch in the agent of the provision of data and the performance of operations or to inquire whether to switch the agent of the user, on the terminal screen 121.

While the local client 120 is waiting for user input via the user menu, the local server 110 may download the task environment information 103, in which the configuration of the screen of the remote server 100 or the state information of the screen of the remote server 100 has been stored, via the data link C.

When the downloading of the task environment information 103 by the local server 110 has been completed, the local server 110 may apply the task environment information 103 to the processing and manipulation of the image data 101 or the result data 102. Thereafter, the local server 110 may make a switch in the agent of the provision of data and the performance of operations automatically or in response to user input for the user menu provided by the local client 120.

Although a case where the single local client 120 and the single local server 110 are present in the local computer 20 has been shown in FIG. 1 for ease of description, the local computer 20 may be a small-sized network including a plurality of processors in another embodiment of the present invention. That is, in this case, a plurality of local clients 120 may be present in the local computer 20. In this case, whether the local server 110 will partially take charge of the provision of data and performance of operations of all of the local clients 120, the provision of data and performance of operations of some of the local clients 120, or the provision of data and performance of operations of some of the local clients 120, or part of the provision of data and performance of operations of one of the local clients 120 may be determined by taking into account the computing resources that are possessed by the local server 110. This process may be performed using a common load balancing technique.

The present invention relates to technology in which in particular, the local server 110 relays data transmitted between the remote server 100 and the local client 120. In the following, various embodiments of the configuration and function of the local server 110 are described.

Figure 2:
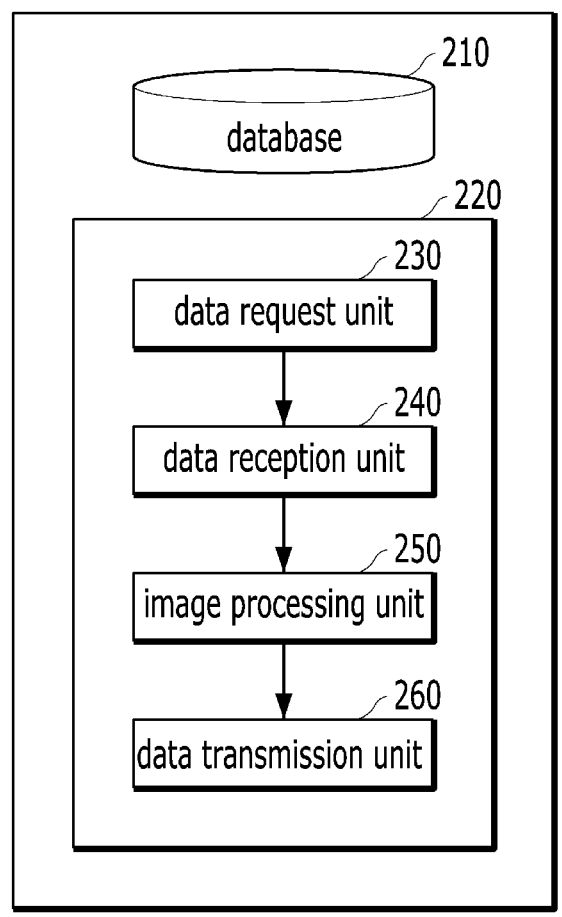
FIG. 2 is a block diagram showing a local server system according to an embodiment of the present invention.

FIG. 2 is a block diagram showing a local server system 200 according to an embodiment of the present invention.

Referring to FIG. 2, the local server system 200 according to the embodiment of the present invention may include a database 210 and a processor 220. The processor 220 may include a data request unit 230, a data reception unit 240, an image processing unit 250, and a data transmission unit 260.

The processor 220 requests image data from the remote server 100, and downloads the image data. The image data downloaded from the remote server 100 is stored in the database 210.

The data request unit 230 requests image data corresponding to first result data, requested from the remote server 100 by the local client 120, from the remote server 100.

In this case, the image data refers to original image data stored on the remote server 100. In an embodiment, the image data may refer to an original image of 3D medical image data that is loaded by a viewer and is then used, as in CT, MR, etc.

Furthermore, the result data refers to result data obtained by processing data to be displayed on the screen of the local client 120, i.e., image data, and refers to image data, i.e., data other than an original image. For example, the result data may be a 3D volume rendering image, a curved planar reformatted (CPR) image, a multi-planar reformatted (MPR) image, an axial image, a sagittal image, or a coronal image, or refers to an image segmentation result, an image registration result, measured length, area or volume, or analysis or diagnosis result. In another embodiment, the result data may be data, such as mask data attributable to image segmentation, a label regarding image data, a label regarding previous result data, or the like. The first result data refers to result data that is transmitted from the remote server 100 to the local client 120. For ease of description, it is assumed that the first result data described in the following is result data 102 processed in the remote server 100.

The data reception unit 240 downloads image data, requested by the data request unit 230, from the remote server 100. In this case, while the local client 120 is receiving the first result data from the remote server 100, the data reception unit 240 may download image data from the remote server 100 in a background environment.

Furthermore, the data reception unit 240 may download the image data and the first result data together from the remote server 100.

Furthermore, the data reception unit 240 may download the image data and the task environment information 103 of the remote server 100 together.

In this case, the task environment information 103 is information intended to seamlessly maintain a work environment such as the configuration, state, etc. of a current screen, and may be information about the configuration of a layout, information about the rendering settings of each screen within the layout, information about a state such as enlargement, reduction or the like, information about settings regarding the displaying status of an image (for example, overlay on/off, windowing information, or the like). The data reception unit 240 may download at least one of the above pieces of information as the task environment information 103.

Furthermore, the task environment information 103 may include environment information throughout the process of generating the result data from the image data. In this case, the environment information enables identity with the result data generated by the remote server 100 to be maintained when the local server 200 generates the new result data from the image data.

The image processing unit 250 generates second result data based on the image data downloaded from the data reception unit 240. In this case, the second result data refers to result data that the local server 200 locally generates through processing in place of the remote server 100. That is, the data that has been processed by the remote server 100 may be referred to as the first result data, and the data that has been processed by the local server 200 in place of the remote server 100 may be referred to as the second result data.

In this case, the image processing unit 250 may perform image volume rendering and the like in order to generate the second result data. Furthermore, the image processing unit 250 may generate image segmentation, and measurement results, such as the length, area or volume of each image-segmented region.

Furthermore, the image processing unit 250 may generate the second result data by applying the downloaded task environment information of the remote server 100 thereto. In this case, the image processing unit 250 may adaptively apply the task environment information according to the characteristics of the second result data.

Furthermore, when the local client 120 requests the second result data corresponding to the image data from the remote server 100, the image processing unit 250 may generate the second result data based on the image data. That is, when the downloading from the data reception unit 240 has been completed and new result data is requested, the local server 200 may generate result data in place of the remote server 100.

Furthermore, the image processing unit 250 may generate the second result data based on the image data, the first result data, and an image processing workflow. That is, with regard to the image processing unit 250, after the downloading has been completed in the data reception unit 240, the local server 200 may generate result data, required to be generated in terms of a workflow, in place of the remote server 100 even before a request for new result data is made.

When the local client 120 requests the second result data corresponding to the image data from the remote server 100, the data transmission unit 260 provides the second result data to the local client 120.

Furthermore, the data transmission unit 260 uploads the second result data to the remote server 100. That is, the result data changed in the local server 200 may be uploaded to the remote server 100, and thus the result data of the remote server 100 may be updated or synchronized.

Furthermore, when image data displayed on the screen 121 of the local client 120 is terminated or when input, such as the loading of another image, occurs, not only the result data changed in the local server 110 but also the current task environment information of the local server 110 may be uploaded to the remote server 100. In this case, the existing task environment information of the remote server 100 may be replaced with current task environment information, or a time stamp may be added to task environment information and thus the newest information may be applied during a later access. A plurality of pieces of task environment information to which time stamps has been added may be managed by applying a common version management or control technique. Although task environment information to which the newest time stamp has been added is generally applied as the newest update information, a specific version of task environment information may be applied as reference update information according to the selection of the user of the local client 120 or the determination of an operating system (O/S).

For ease of description, the first result data generated in the remote server 100 and the second result data generated in the local server 110 for the same image data are distinctively illustrated. However, after a conversion has been made such that the local server 110 takes charge of the operation and processing of image data in place of the remote server 100, the local server 110 may store the first result data generated by the remote server 100, and may provide the first result data to the local client 120 in response to a request from the local client 120. The first result data may be also downloaded when the image data is downloaded from the remote server 100 to the local server 110, or may be sequentially downloaded to the local server 110 after the image data has been downloaded from the remote server 100 to the local server 110.

The local client 120 requests the result data without knowing whether the result data will be generated in the local server 110 or in the remote server 100 when the result data is requested. The result data requested by the local client 120 may be interpreted as the first result data before the agent of operations and processing is switched to the local server 110, and the result data requested by the local client 120 may be interpreted as the second result data after the agent of operations and processing has been switched.

Figure 3:
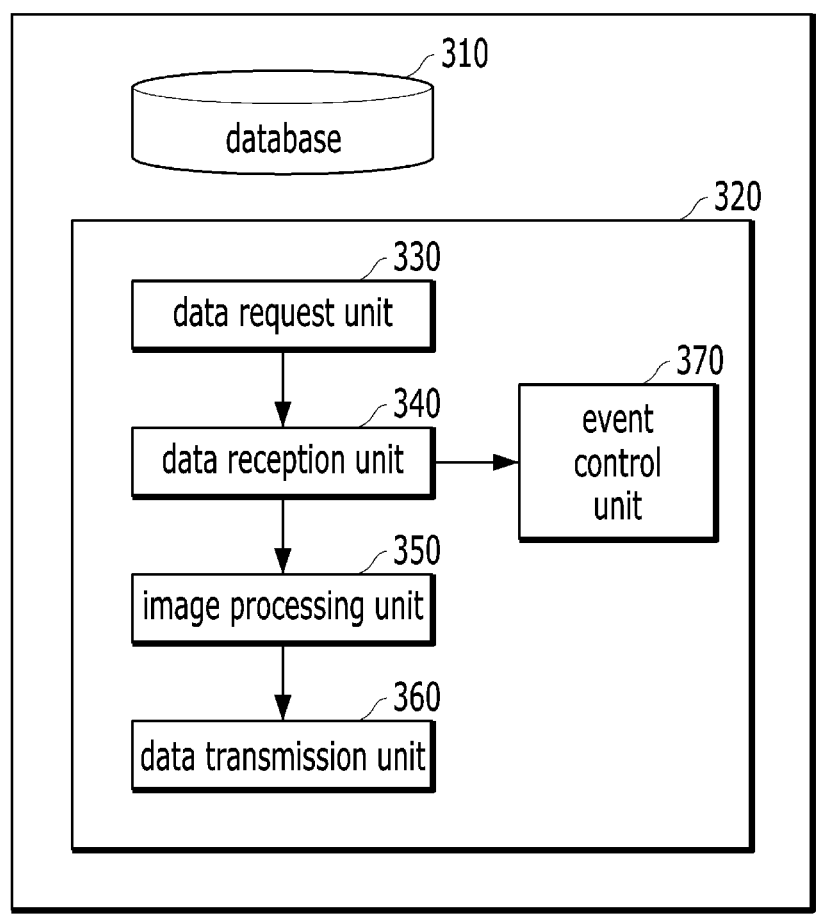
FIG. 3 is a block diagram showing a local server system according to another embodiment of the present invention.

FIG. 3 is a block diagram showing a local server system according to another embodiment of the present invention.

Referring to FIG. 3, the local server system 300 according to the other embodiment of the present invention may include a database 310, and a processor 320. The processor 320 may include a data request unit 330, a data reception unit 340, an image processing unit 350, a data transmission unit 360, and an event control unit 370.

In this case, since the database 310, the processor 320, the data request unit 330, the data reception unit 340, the image processing unit 350, and the data transmission unit 360 are the same as the database 210, the processor 220, the data request unit 230, the data reception unit 240, the image processing unit 250, and the data transmission unit 260 shown in FIG. 2, respectively, redundant descriptions thereof are omitted below.

The local server system 300 according to the other embodiment of the present invention may further include an event control unit 370.

After the downloading of the image data has been completed, the event control unit 370 controls the local client 120 so that a user menu regarding an event intended to switch a main role of the image data processing function of the remote server 100 to the local server 300 is provided to the user of the local client 120. That is, the processor of the present embodiment may provide a confirmation menu, adapted to switch a main role of the image data processing function of the remote server 100 to the local server 300, to the user of the local client 120 via the event control unit 370. As an example of this, a popup message regarding whether to switch to the local server 300 may be displayed on the screen of the local client 120.

At the same time, the processor 220 of the present embodiment may seamlessly and automatically switch from a thin client environment to a thick client environment.

An operation flowchart of the present invention is described in brief based on the above detailed description.

Figure 4:
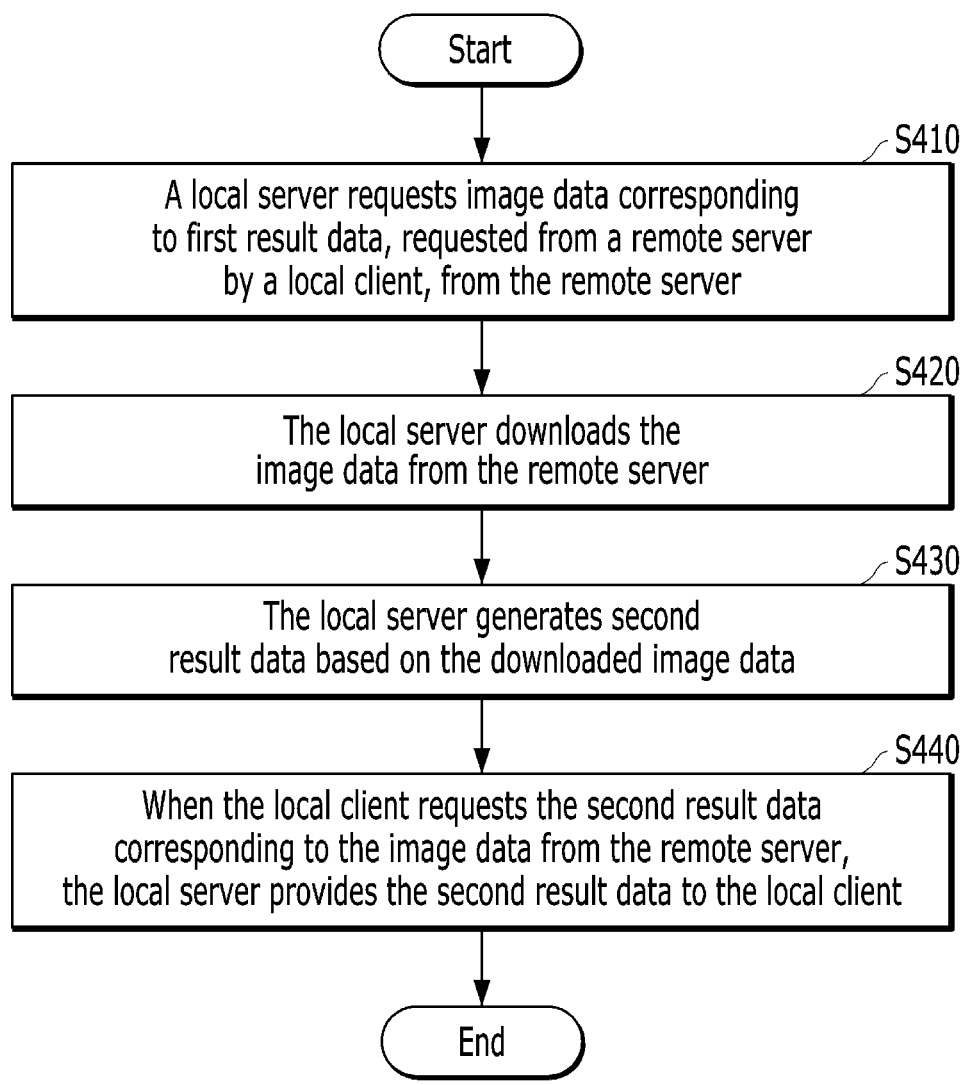
FIG. 4 is an operation flowchart showing a method of relaying data in a local server according to an embodiment of the present invention.

FIG. 4 is an operation flowchart showing a method of relaying data in a local server according to an embodiment of the present invention.

Referring to FIG. 4, first, the method of relaying data in a local server according to the embodiment of the present invention includes step S410 of requesting, by the data request unit 230 of the local server 200, image data corresponding to first result data, requested by the remote server 100 by the local client 120, from the remote server 100.

In this case, the image data refers to original image data stored on the remote server 100, and the first result data refers to result data obtained through the processing of the remote server 100, i.e., result data obtained by processing data to be displayed on the screen of the local client 120 (i.e., the image data).

Thereafter, at step S420, the data reception unit 240 downloads the image data, requested by the data request unit 230, from the remote server 100.

In this case, the data reception unit 240 performs execution as a background process while the local client 120 is receiving the first result data from the remote server 100. Furthermore, at step S420, the data reception unit 240 may download the first result data or task environment information along with the image data from the remote server 100. Since this has been described in detail above, a description thereof is omitted below.

Thereafter, at step S430, the image processing unit 250 generates second result data based on the image data downloaded from the data reception unit 240.

In this case, the second result data refers to result data that the local server 200 locally generates through processing in place of the remote server 100. That is, the data processed by the remote server 100 may be referred to as the first result data, and the data processed by the local server 200 in place of the remote server 100 may be referred to as the second result data.

Furthermore, at step S430, the image processing unit 250 may perform image volume rendering in order to generate the second result data.

Thereafter, at step S440, when the local client 120 requests the second result data corresponding to the image data from the remote server 100, the data transmission unit 260 provides the second result data to the local client 120.

In this case, at step S440, the data transmission unit 260 may upload the second result data to the remote server 100. That is, the result data changed in the local server 200 may be uploaded to the remote server 100, and thus the result data of the remote server 100 may be updated or synchronized.

Figure 5:
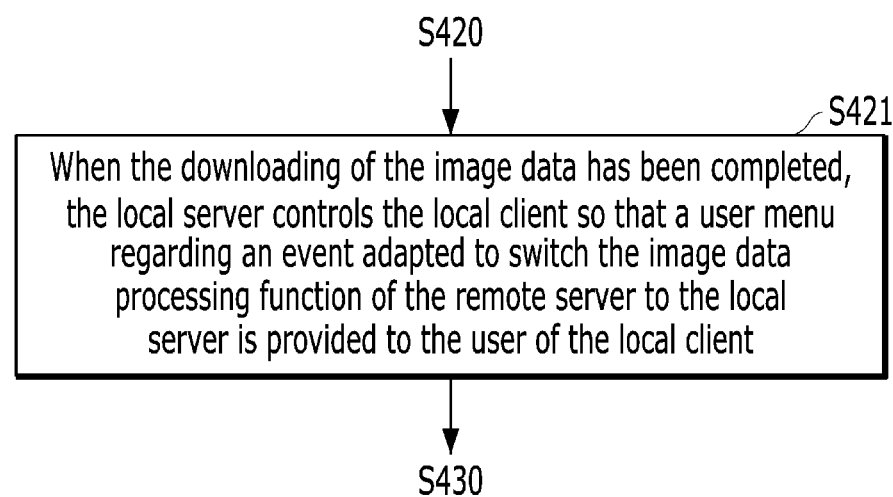
FIG. 5 is an operation flowchart showing a method of relaying data in a local server according to another embodiment of the present invention, in which a step different from the steps of FIG. 4 is shown in detail.

FIG. 5 is an operation flowchart showing a method of relaying data in a local server according to another embodiment of the present invention, in which a step different from the steps of FIG. 4 is shown in detail.

Referring to FIG. 5, at step S421 after step S420 of FIG. 4, after the downloading of the image data has been completed, the event control unit 370 may control the local client 120 so that a user menu regarding an event intended to switch the image data processing function of the remote server 100 to the local server 300 is provided to the user of the local client 120.

That is, at step S421, the processor of the present embodiment may provide a confirmation menu, adapted to switch the image data processing function of the remote server 100 to the local server 300, to the user of the local client 120.

As an example, a popup message regarding whether to switch to the local server 300 may be displayed on the screen of the local client 120.

Thereafter, steps S430 and S440 of FIG. 4 may be performed after step S421.

A method of relaying data in a local server according to an embodiment of the present invention may be implemented in the form of program instructions that can be executed by a variety of computer means, and may be stored on a computer-readable storage medium. The computer-readable storage medium may include program instructions, a data file, and a data structure solely or in combination. The program instructions that are stored on the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

The present invention has the advantage of providing the local server system and the method of relaying data in the local server system, particularly the local server system and the method of relaying data in the local server system, in which the local server system requests image data corresponding to first result data, requested from a remote server by a local client, from the remote server, downloads the image data from the remote server, generates second result data based on the downloaded image data, and provides the second result data to the local client when the local client requests the second result data corresponding to the image data from the remote server, thereby seamlessly switching from a thin client environment to a thick client environment.

The present invention has the advantage of reducing the computational burden of the server in the local computer apparatus and also reducing the burden of the overall network by reducing the amount of data transmission via the remote network.

The present invention has the advantage of adaptively reducing a computational burden concentrated on the server effectively using a local computing environment and local computing resources. According to at least one embodiment of the present invention, when a similar image processing operation needs to be repeatedly performed, as in the case where user interactions are frequently performed on the same original image, data to be provided to the local client may be more effectively generated through the cooperation between the remote server and the local server system. For this purpose, according to at least one embodiment of the present invention, original image data for which frequent user interactions occur is shared by the remote server and the local server system, and the remote server and the local server system partially take charge of image processing attributable to frequent updates, thereby enabling the cooperation between the remote server and the local server system.

The present invention has been derived from research conducted as part of the Robot Industry Convergence Core Technology Development Project sponsored by the Korean Ministry of Trade, Industry and Energy and the Korea Institute of Industrial Technology Evaluation and Planning [Project Management Number: 10041605; Project Name: Development of Robot System for 2 mm-sized Error Level Bone Positioning and Tunneling Surgeries for the Purpose of Improving Accuracy and Safety of Musculoskeletal Restoration Surgeries for Damaged Upper and Lower Limbs].

While the present invention has been described in conjunction with specific details, such as specific elements, and limited embodiments and diagrams, above, these are provided merely to help an overall understanding of the present invention. The present invention is not limited to these embodiments, and various modifications and variations can be made based on the foregoing description by those having ordinary knowledge in the art to which the present invention pertains.

Therefore, the technical spirit of the present invention should not be determined based only on the described embodiments, and the following claims, all equivalents to the claims and equivalent modifications should be construed as falling within the scope of the spirit of the present invention.

What is claimed is:

1. A method of relaying data in a local server, the method comprising:
   requesting, by a local server, image data from a remote server, the image data corresponding to first result data requested from the remote server by a local client, wherein the first result data has been generated or processed based on the image data and has been at least generated, processed, or stored by the remote server;
   downloading, by the local server, the image data from the remote server;
   generating, by the local server, second result data based on the downloaded image data by applying an image processing operation to the downloaded image data; and
   providing, by the local server, the second result data to the local client in place of the remote server when the local client requests the second result data corresponding to the image data from the remote server.

2. The method of claim 1, wherein the downloading is performed as a background process while the local client is receiving the first result data from the remote server.

3. The method of claim 1, wherein the downloading comprises downloading the image data and the first result data together from the remote server.

4. The method of claim 1, wherein the downloading comprises downloading task environment information of the remote server together with the image data.

5. The method of claim 4, wherein the generating comprises generating the second result data by applying the downloaded task environment information of the remote server thereto.

6. The method of claim 4, wherein the downloading comprises downloading at least one of information about a configuration of a layout, information about rendering settings of each screen within the layout, and information about settings regarding a displaying status as the task environment information.

7. The method of claim 1, wherein the generating comprises generating the second result data based on the image data when the local client requests the second result data corresponding to the image data from the remote server.

8. The method of claim 1, wherein the generating comprises generating the second result data based on the image data, the first result data, and an image processing workflow.

9. The method of claim 1, further comprising controlling, by the local server, the local client so that a user menu regarding an event intended to switch an image data processing function of the remote server to the local server is provided to a user of the local client when the downloading of the image data has been completed.

10. A method of relaying data in a local server, the method comprising:
    requesting, by a local server, image data from a remote server, the image data corresponding to first result data requested from the remote server by a local client, wherein the first result data has been generated or processed based on the image data and has been at least generated, processed, or stored by the remote server;
    downloading, by the local server, the image data from the remote server;
    generating, by the local server, second result data based on the downloaded image data;
    providing, by the local server, the second result data to the local client in place of the remote server when the local client requests the second result data corresponding to the image data from the remote server; and
    uploading, by the local server, the second result data to the remote server.

11. A local server system, comprising:
    a database configured to store image data downloaded from a remote server; and
    a processor configured to:
    request the image data from the remote server;
    download the image data;
    request first image data from the remote server, the first image data corresponding to first result data requested from the remote server by a local client, wherein the first result data has been generated or processed based on the first image data and has been at least generated, processed, or stored by the remote server;

download the first image data from the remote server;

generate second result data based on the downloaded first image data by applying an image processing operation to the downloaded image data; and provide the second result data to the local client in place of the remote server when the local client requests the second result data corresponding to the first image data from the remote server.

12. The local server system of claim 11, wherein the processor is further configured to download the first image data as a background process while the local client is receiving the first result data from the remote server.

13. The local server system of claim 11, wherein the processor is further configured to download task environment information of the remote server together with the first image data.

14. The local server system of claim 11, wherein the processor is further configured to generate the second result data based on the first image data when the local client requests the second result data corresponding to the first image data from the remote server.

15. The local server system of claim 11, wherein the processor is further configured to generate the second result data based on the first image data, the first result data, and an image processing workflow.

16. The local server system of claim 11, wherein the processor is further configured to control the local client so that a user menu regarding an event intended to switch a first image data processing function of the remote server to the local server is provided to a user of the local client when the downloading of the first image data has been completed.

17. A local server system, comprising:
a database configured to store image data downloaded from a remote server; and
a processor configured to:
request the image data from the remote server;
download the image data;
request first image data from the remote server, the first image data corresponding to first result data requested from the remote server by a local client, wherein the first result data has been generated or processed based on the first image data and has been at least generated, processed, or stored by the remote server;
download the first image data from the remote server;
generate second result data based on the downloaded first image data; and
provide the second result data to the local client in place of the remote server when the local client requests the second result data corresponding to the first image data from the remote server,
wherein the processor is further configured to upload the second result data to the remote server.

18. A non-transitory computer-readable medium containing program instructions executed by a processor installed in a local server computing system of relaying data including a medical image, wherein the program instructions comprise:
request image data from a remote server;
download the image data;
request first image data from the remote server, the first image data corresponding to first result data requested from the remote server by a local client, wherein the first result data has been generated or processed based on the first image data and has been at least generated, processed, or stored by the remote server;
download the first image data from the remote server;
generate second result data based on the downloaded first image data by applying an image processing operation to the downloaded image data; and
provide the second result data to the local client in place of the remote server when the local client requests the second result data corresponding to the first image data from the remote server.

* * * * *